(12) United States Patent
Baker et al.

(10) Patent No.: US 9,386,444 B2
(45) Date of Patent: *Jul. 5, 2016

(54) METHOD OF SIGNALLING INFORMATION

(71) Applicant: KONINKLIJKE PHILIPS N.V., Eindhoven (NL)

(72) Inventors: Matthew P. J. Baker, Canterbury (GB); Timothy James Moulsley, Caterham (GB); Filippo Tosato, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 334 days.

This patent is subject to a terminal disclaimer.

(21) Appl. No.: 13/962,254

(22) Filed: Aug. 8, 2013

(65) Prior Publication Data
US 2013/0324053 A1 Dec. 5, 2013

Related U.S. Application Data

(63) Continuation of application No. 12/739,169, filed as application No. PCT/IB2008/054326 on Oct. 21, 2008, now Pat. No. 8,526,991.

(30) Foreign Application Priority Data

Oct. 30, 2007 (EP) ..................................... 07301513

(51) Int. Cl.
*H04B 1/00* (2006.01)
*H04W 8/22* (2009.01)
(Continued)

(52) U.S. Cl.
CPC .................. *H04W 8/22* (2013.01); *H04L 1/001* (2013.01); *H04L 1/0004* (2013.01);
(Continued)

(58) Field of Classification Search
CPC .... H04B 7/2637; H04L 1/001; H04L 1/0025; H04L 1/0004; H04L 1/0028; H04W 52/265; H04W 52/343; H04W 52/10; H04W 16/28; H04W 8/22; H04W 48/12; H04W 72/042
USPC ............ 455/452, 436, 522, 450, 68; 370/329, 370/437, 462, 232; 375/222, 259
See application file for complete search history.

(56) References Cited

U.S. PATENT DOCUMENTS 6,697,422 B1 * 2/2004 Mathai .................... H04L 1/001
370/329
2002/0099689 A1 * 7/2002 Bergman ............... G06Q 10/06
(Continued)

FOREIGN PATENT DOCUMENTS

EP 1134926 A 9/2001
EP 1887714 A 2/2008
(Continued)

*Primary Examiner* — Mahendra Patel

(57) ABSTRACT

The present invention relates to a method for transmission of control information from a primary station to at least one secondary station, comprising the step of transmitting with a first set of control information parameters control information corresponding to data transmission with a first set of data parameters and transmitting with a second set of control information parameters control information corresponding to data transmission with a second set of data parameters, wherein at least one control information parameter has a difference in value between the two sets of control information parameters, said difference in value having a dependency on the difference between the value of a data parameter in the first set of data parameters and the value of the data parameter in the second set of data parameters, said data parameter being a different parameter from the at least one control information parameter.

40 Claims, 2 Drawing Sheets

(51) Int. Cl.
*H04L 1/00* (2006.01)
*H04W 48/12* (2009.01)
*H04W 16/28* (2009.01)
*H04W 72/04* (2009.01)

(52) U.S. Cl.
CPC ........... *H04L 1/0025* (2013.01); *H04L 1/0028* (2013.01); *H04W 48/12* (2013.01); *H04W 16/28* (2013.01); *H04W 72/042* (2013.01)

(56) References Cited

U.S. PATENT DOCUMENTS

| | | | | |
|---|---|---|---|---|
| 2003/0123470 | A1* | 7/2003 | Kim | H04B 7/2637 370/437 |
| 2006/0142021 | A1 | 6/2006 | Mueckenheim et al. | |
| 2006/0153227 | A1* | 7/2006 | Hwang | H04L 1/0025 370/465 |
| 2006/0215559 | A1* | 9/2006 | Mese | H04W 52/265 370/232 |
| 2007/0189047 | A1* | 8/2007 | Lee | H04W 52/243 363/62 |
| 2008/0220805 | A1* | 9/2008 | Dayal | H04W 52/10 455/522 |
| 2013/0114408 | A1* | 5/2013 | Sastry | H04W 28/02 370/231 |

FOREIGN PATENT DOCUMENTS

| | | |
|---|---|---|
| EP | 1944896 A | 7/2008 |
| JP | 2006191592 A | 7/2006 |

\* cited by examiner

METHOD OF SIGNALLING INFORMATION

This application claims the benefit or priority of and describes relationships between the following applications: wherein this application is a continuation of U.S. patent application Ser. No. 12/739,169, filed Apr. 22, 2010, which is the National Stage of International Application No. PCT/IB2008/054326, filed Oct. 21, 2008, which claims the priority of foreign application 07301513.3 filed Oct. 30, 2007, all of which are incorporated herein in whole by reference.

The present invention relates to a method of signalling control information in a telecommunication network.

This invention is, for example, relevant for mobile systems, like Universal Mobile Telecommunication Network (UMTS), GSM or similar. The invention could also be applied to any other communication systems.

In a conventional mobile telecommunication system, like UMTS, the primary station like a base station (or NodeB) and the secondary stations, like the mobile stations communicate together by means of a plurality of channels. Mainly, data channels are used for transmitting data from a primary station to the secondary stations, and control channels are used for giving information on the operation of the communication systems.

Usually, when the primary station wishes to change a transmission parameter for data, like increasing the transmission power of the signals transmitted on the data channels, the primary station applies the same increase in power for the control channel.

However, this leads to an increase of the interference for all the secondary stations, and is not always the most adequate parameter amendment to be carried out.

More specifically, in systems where it is possible for the secondary stations to apply specific beamforming for data transmissions (in UMTS LTE), the range of coverage for the data transmissions increases for the beamforming transmissions compared to other transmissions in normal mode. However, if the control signalling indicating the data transmission parameters (inter alia, the time-frequency resources and MCS (modulation and coding scheme)) is unreliable, the increase in coverage for data will not be advantageous as the secondary station would be unable to receive sufficient information to know how to decode the data (even though if it had that information the SNR would be sufficient for decoding).

One solution would be to apply beamforming to the control channel also. However, in systems such as LTE which have a common control channel containing control signalling for multiple secondary stations, beamforming cannot easily be used for the transmission of the control channel, as the pilot symbols embedded in the control channel are common for all secondary stations—i.e. they are used as a phase reference for decoding the control signalling by all secondary stations, irrespective of whether the data transmissions to a particular secondary station use beamforming or not. Consequently, the pilot symbols in the control channel cannot use beamforming (otherwise they would not provide a correct phase reference for the secondary stations whose control channels do not use beamforming), and therefore if beamforming were applied to the control signalling for some secondary stations, there would be no suitable beamformed phase reference for the control signalling for those secondary stations.

It is an object of the invention to propose a method for transmission of control information which permits to reduce the interference by using different transmission parameters from the data transmission.

Another object of the invention is to propose a method of transmission of control information to a plurality of secondary stations, where the data transmissions to some of the secondary stations is operated by beamforming.

To this end, in accordance with the invention a method is proposed for transmission of control information from a primary station to at least one secondary station, comprising the step of transmitting with a first set of control information parameters control information corresponding to data transmission with a first set of data parameters and transmitting with a second set of control information parameters control information corresponding to data transmission with a second set of data parameters, wherein at least one control information parameter has a difference in value between the two sets of control information parameters, said difference in value having a dependency on the difference between the value of a data parameter in the first set of data parameters and the value of the data parameter in the second set of data parameters, said data parameter being a different parameter from the at least one control information parameter.

As a consequence, if a data parameter is changed, it is possible to choose a change in a different control parameter, to prevent an increase of the interference arising from transmission of the control channel. For instance, when the transmission power is increased for data transmission with a secondary station, the corresponding parameter change in the signalling of control information may be a decrease in the code rate for the information to be signalled to the considered secondary station.

In particular, the invention has the benefit that by linking the change in control parameter to the change in data parameter in a coordinated way, unnecessary interference or wastage of transmission capacity are avoided compared to the case when parameter changes are uncoordinated.

In an embodiment of this invention, it is further proposed a method for transmission of control information from a primary station to at least one secondary station, comprising the step of transmitting control information with a set of parameters, said set of parameters has a dependency on a data transmission mode to the at least one secondary station, wherein the data transmission mode is one of a beamforming transmission mode and a normal mode.

Then, it permits to obtain the same increase of range obtained by using beamforming on the data channel, but without using beamforming in the control channel.

The present invention also relates to a secondary station comprising means for carrying out the method in accordance with the invention.

The present invention also relates to a primary station comprising means for carrying out the method in accordance with the invention.

These and other aspects of the invention will be apparent from and will be elucidated with reference to the embodiments described hereinafter.

The present invention will now be described in more detail, by way of example, with reference to the accompanying drawings, wherein.

Figure 1:
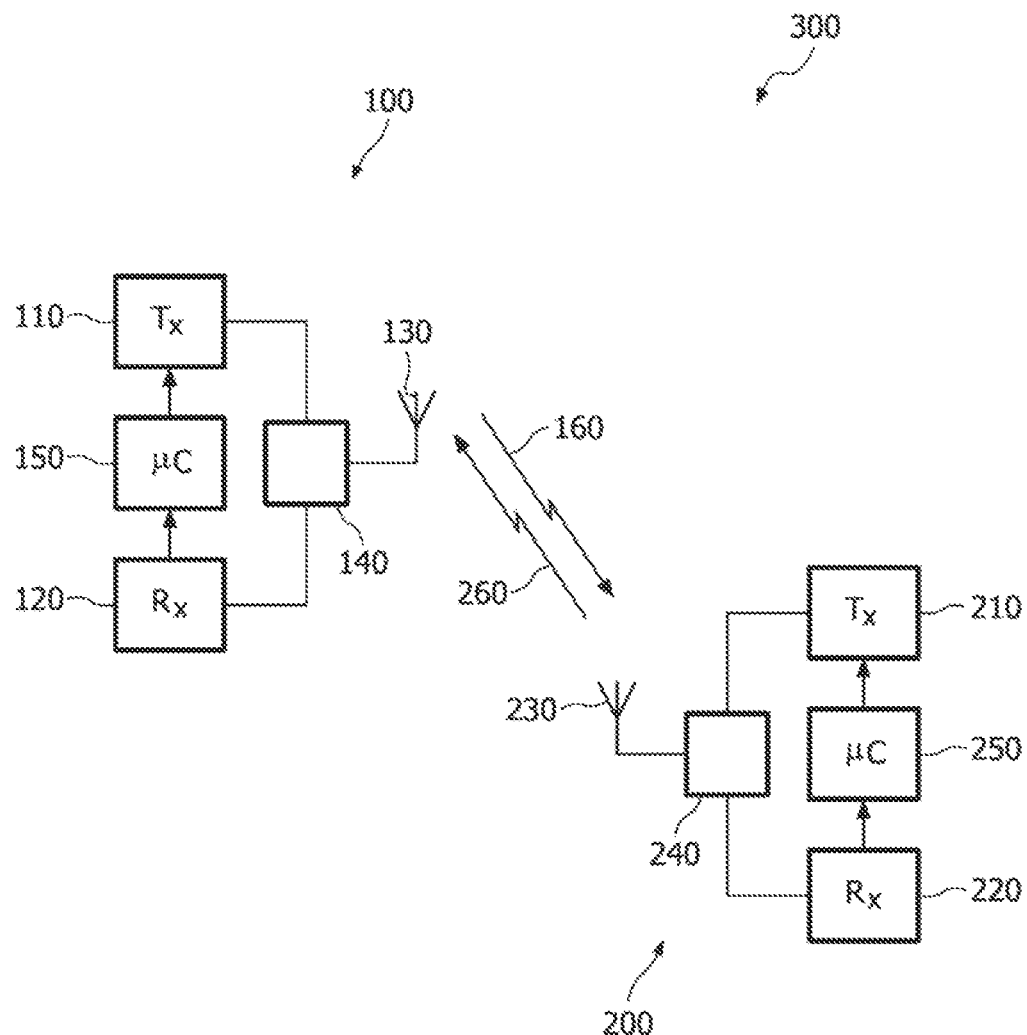
FIG. 1 is a block diagram representing a network comprising a primary station and a secondary station in accordance with the invention.

The present invention relates to a system of communication 300 as depicted in FIG. 1, comprising a primary station 100, like a base station or an evolved Node B (eNodeB), and at least one secondary station 200 like a mobile station or a User Equipment (also denoted UE).

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna array 130, comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna array 230, which may comprise a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first set of channels 160 and transmission from the secondary radio station 200 to the first radio station 100 takes place on a second set of channels 260.

In a first embodiment of the invention, a primary station may transmit data to a secondary station pursuant to several different modes. In each mode, a set of a plurality of transmission data parameters is chosen. When the primary station wishes to change from a first mode to another mode, for instance to reach a higher throughput, or to increase the range of the transmission, at least one of the data parameters is changed.

In several variants of the invention, the amended data parameter may comprise at least one of:
  a beamforming mode or a number of antennas, or a number of data streams,
  a transmission power,
  a code rate,
  a modulation scheme,
  a transmit diversity scheme,
  a number of spatial layers,
  a precoding matrix,
  a number of subcarriers,
  a frequency band,
  a spreading factor.

Similarly, the control information is transmitted with different sets of control parameters, each set corresponding to a data transmission mode. When the primary station switches from a first mode to the second mode, a modification of transmission is carried out on at least one data parameter, and a corresponding modification of at least one control parameter is automatically carried out as well. However, in accordance with the invention, the amended control parameter is of a different type from the type of the amended data parameter.

For instance, the switching from a first mode to a second mode may comprise an increase of the number of subcarriers of the data signal, and an increase of the code rate of the control information.

The selection of the second set of control parameters may be done in a clever way, if the second set of data parameters is selected such that it changes the communication range of the data transmission compared to the first set of data parameters. This is the case for instance if the transmission power is increased (whole coverage increased) or if a beamforming is applied (range increased in a single direction). It is then advantageous if the second set of control information parameters is selected such that it also changes the communication range of the control information compared to the first set of control information parameters. In such a case, the range of the control information can be increased if the range of the data transmission is also increased due to the switching from one mode to another. The control parameter values may be selected, or determined so that the change in communication range of the control information corresponds approximately to the change in communication range of the data transmission.

In the preceding example, the illustrated method is particularly suitable when the first mode is a normal mode (for example a single antenna transmission) and the second mode is a data beamforming mode. This beamforming mode leads to an increase of the data communication range at least in one direction.

To reduce the interference, and to avoid disturbance of the pilot symbols embedded in the control channels due to phase shifts, the control information is not beamformed, but is for instance transmitted with a reduced code rate. Thus, the control transmission is more robust to interference and may be decoded in a wider area.

Figure 2:
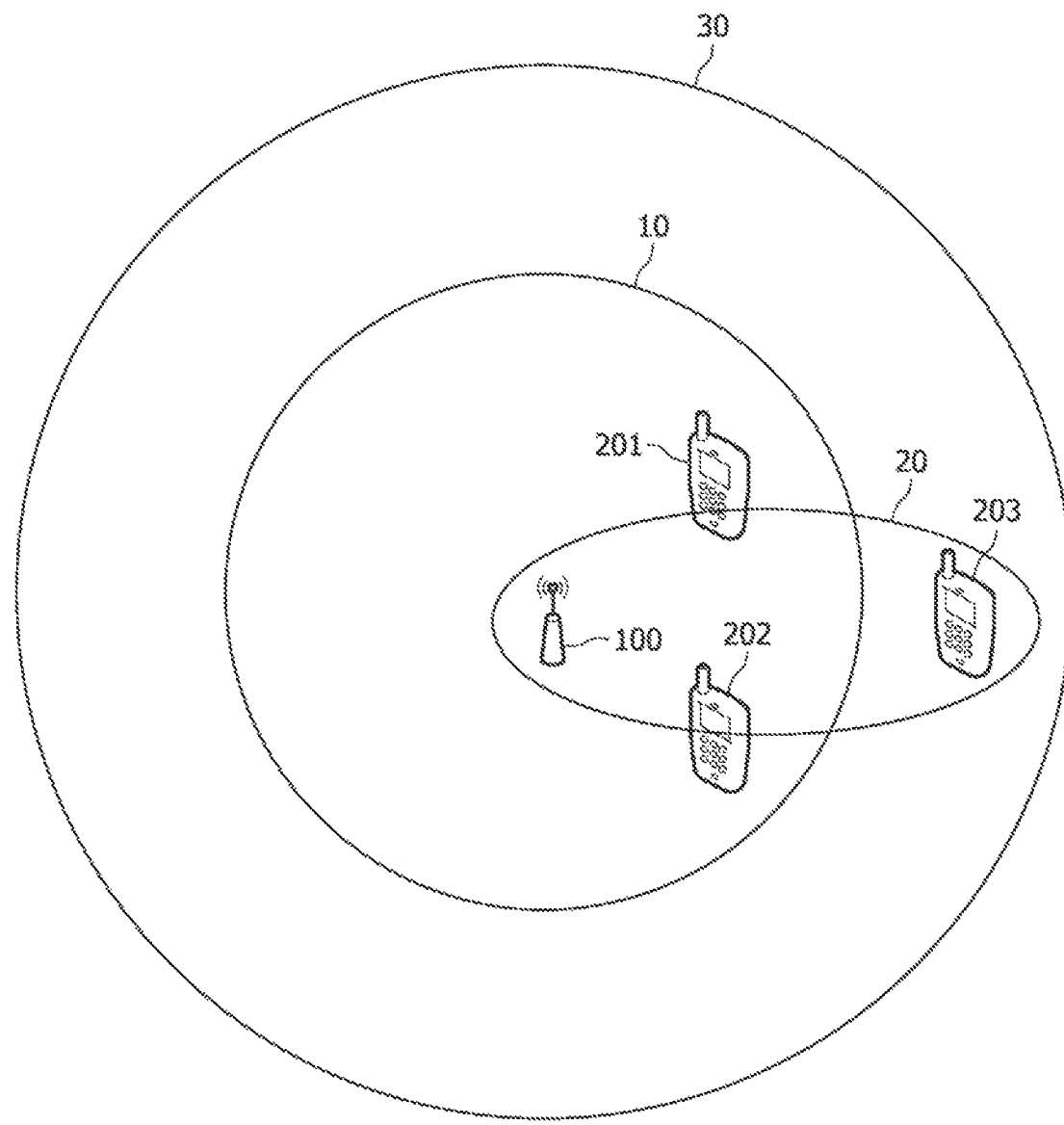
FIG. 2 is a representation of the coverages corresponding to each mode of transmission in accordance with the invention.

This example is illustrated on FIG. 2, where the base station 100 operates firstly in a first mode, which is not a beamforming mode, but a normal mode. In this mode, the data and signalling coverage is noted as 10, and permits to reach mobile stations 201 and 202. However, to reach mobile station 203, the coverage must be changed. Then, the base station 100 starts transmitting with a beamforming mode, where the transmission beam is directed towards the mobile station 203. In such a case, the data coverage is noted as 20 and permits to reach the secondary station 203. Moreover, since the control signal for the secondary station 203 cannot be beamformed as explained before, the base station 100 transmits this control signal by using a lower rate, or using a lower frequency band, permitting to increase the coverage. In such a case, the control signal coverage noted 30 permits to reach the secondary station 203. Moreover, by reducing the code rate rather than increasing the transmission power of the control signal, this avoids an interference increase.

In this example, the code rate in the control signal is chosen for the second mode so that the range of the control signal is greater than or equal to the range of the data signal for the second mode.

In an example of this embodiment, the control information is coded in messages of a size being chosen from a set of predetermined control message sizes. Indeed, in current proposals for LTE, the control signalling for each secondary station is coded into one of a set of available control channel message sizes. Then, reducing the code rate of control signalling for a secondary station whose data transmission was beamformed could comprise employing a code rate such that the number of coded bits could be mapped into a larger message size than the signalling information for a secondary station whose data transmission was not beamformed.

In various examples of the invention, the modified control parameter may be one the following:
  a modulation order;
  a transmission power;
  a reduced code rate.

According to the present invention, one or more transmission parameters of the control signalling corresponding to a data transmission which uses beamforming are adjusted with respect to the transmission parameters of control signalling corresponding to data transmissions which do not use beamforming.

This would enable the coverage of the control channel to be increased to substantially match that of the data channel. Advantageously, the adjustment in transmission parameters is designed to give a substantially similar increase in coverage to that which would be obtained by the application of beamforming. The adjustment of transmission parameters could for example comprise one or more of the following:

reducing code rate;
reducing modulation order;
increasing transmission power.

In a further embodiment, a base station can transmit in two frequency bands (for example 900 MHz and 2.1 GHz). Due to differences in radio propagation the coverage is greater for the lower frequency band. Therefore, to maintain coverage, beamforming is applied to transmissions in the higher frequency band. If the control channel is transmitted from the base station in the lower frequency band, then the data channel may be transmitted in the same frequency band, or in a higher frequency band. In this case in accordance with the invention, beamforming is applied to the data channel transmitted in the higher frequency band. If the control channel is transmitted in the higher frequency band then one or more transmission parameters of the control channel are adjusted in order to maintain similar coverage to that achieved with the low frequency band, or the high frequency band with beamforming.

It is to be noted that the present invention is not limited to mobile communication systems such as the LTE of UMTS, but it is possibly also applicable to other standards such as evolutions of WiMAX or cdma2000.

Indeed, the present invention is not limited to mobile telecommunications systems described herein as an example, but could be extended to any other communication systems.

In the present specification and claims the word "a" or "an" preceding an element does not exclude the presence of a plurality of such elements. Further, the word "comprising" does not exclude the presence of other elements or steps than those listed.

The invention has been largely described in relation to signalling and data transmissions made by a network entity to a mobile terminal, but it will be understood that the invention applies equally to opposite or other allocations of roles to nodes.

From reading the present disclosure, other modifications will be apparent to persons skilled in the art. Such modifications may involve other features, which are already known in the art of radio communication and the art of transmitter power control and which may be used instead of or in addition to features already described herein.

The invention claimed is:

1. A primary station comprising:
a transmitter configured to transmit a first set of control information, using a first set of control transmission parameters, corresponding to a first data transmission using a first set of data transmission parameters;
the transmitter configured to transmit a second set of control information using a second set of control transmission parameters, corresponding to transmission of a second set of data information using a second set of data transmission parameters;
wherein at least one control transmission parameter, in common between the two sets of control transmission parameters, has at least one respective first difference in value, between the values of the at least one common parameter of the two sets of control transmission parameters;
wherein at least one data transmission parameter, in common between the two sets of data transmission parameters, has at least one respective second difference in value, between the values of the at least one common parameter of the two sets of data transmission parameters;
wherein the first difference in value for the at least one control transmission parameter is dependent on the second difference in value for the at least one data transmission parameter;
wherein the data transmission parameter is a different parameter from the at least one control transmission parameter; and
wherein the second set of control transmission parameters is generated such that it provides first different communication ranges of the control information, than is provided by the first set of control transmission parameters;
wherein the second set of data transmission parameters is generated such that it provides second different communication ranges of the data information, than is provided by the first set of data transmission parameters; and
wherein the first difference in communication range of the control information transmission corresponds approximately to the difference in communication range of the data transmission in the same coverage area.

2. A secondary station comprising:
a receiver configured to receive first control information from a primary station using a first set of control transmission parameters, corresponding to a first data transmission using a first set of data transmission parameters; and
the receiver configured to receive second control information from the primary station with a second set of control transmission parameters, corresponding to a second data transmission using a second set of data transmission parameters; and
wherein at least one control transmission parameter has a difference in value between the first and second sets of control transmission parameters;
wherein the difference in value of the at least one control transmission parameter is dependent on a difference between the value of at least one data transmission parameter in the first set of data transmission parameters and a value of at least one corresponding data transmission parameter in the second set of data transmission parameters;
wherein the at least one data transmission parameter is different from the at least one control transmission parameter;
wherein the second set of control transmission parameters is generated such that it provides a different communication range of the control information transmission, from a communication range of the control information provided by the first set of control transmission parameters; and
wherein the difference in communication range of the control information transmission corresponds approximately to the difference in communication range of the data transmission in the same coverage area.

3. The primary station of claim 1, wherein the at least one data transmission parameter is at least one of: a beamforming mode, a transmission power, a code rate, a modulation scheme, a transmit diversity scheme, a number of spatial layers, a precoding matrix, a number of subcarriers, a frequency band, a spreading factor, and a combination thereof.

4. The primary station of claim 1, wherein the second set of data transmission parameters is generated such that it changes the communication range of the data transmission compared to the first set of data transmission parameters.

5. The primary station of claim 4, wherein the at least one data transmission parameter is a beamforming mode, and wherein the change in communication range is an increase.

6. The primary station of claim 1, wherein the at least one control transmission parameter is a transmission code rate.

7. The primary station of claim 6, wherein:
the value of the transmission code rate is lower in the second set of control transmission parameters than in the first set of control transmission parameters;
the control information is coded in messages of a size being chosen from a set of at least two predetermined control information message sizes; and
the selection of the lower value of the transmission code rate is carried out so that the coded information bits fit into a larger message size than the message size for control information transmitted using the first set of control transmission parameters.

8. The primary station of claim 1, wherein the at least one control transmission parameter is a modulation order.

9. The primary station of claim 1, wherein the at least one control transmission parameter is a transmission power.

10. The primary station of claim 1, wherein the at least one control transmission parameter is a frequency band.

11. A primary station comprising:
a transmitter configured to transmit a first set of control information, using a first set of control transmission parameters;
the first set of control information corresponding to a first data transmission, using a first set of data transmission parameters;
the transmitter configured to transmit a second set of control information, using a second set of control transmission parameters, the second set of control information corresponding to a second data transmission using a second set of data transmission parameters;
wherein at least one control transmission parameter from among the two sets of control transmission parameters has a difference in value between the two sets of control transmission parameters;
wherein the difference in value of the at least one control transmission parameter is dependent on a difference in value between the value of at least one data transmission parameter in the first set of data transmission parameters and a value of the corresponding data transmission parameter in the second set of data transmission parameters;
wherein the data transmission parameter is a different parameter from the at least one control transmission parameter, and
wherein the at least one control transmission parameter is a transmission code rate; and
wherein the value of the transmission code rate is lower in the second set of control transmission parameters than in the first set of control transmission parameters and the control information is coded in messages of a size being chosen from a set of at least two predetermined control message sizes, and wherein the selection of the lower value of the transmission code rate is carried out so that the coded information bits fit into a larger message size than the message size for control information transmitted using the first set of control transmission parameters for a communication range in the same coverage area.

12. A secondary station comprising:
a receiver configured to receive first control information from a primary station using a first set of control transmission parameters, corresponding to a first data transmission using a first set of data transmission parameters; and
the receiver configured to receive from the primary station second control information using a second set of control transmission parameters, corresponding to a second data transmission using a second set of data transmission parameters;
wherein at least one control transmission parameter has a difference in value between the first and second sets of control transmission parameters;
wherein the difference in value of the at least one control transmission parameter is dependent on a difference between the value of at least one data transmission parameter in the first set of data transmission parameters and a value of the corresponding at least one data transmission parameter in the second set of data transmission parameters;
wherein the at least one data transmission parameter is a different parameter from the at least one control transmission parameter;
wherein the at least one control transmission parameter is at least a transmission code rate;
wherein the value of the transmission code rate is lower in the second set of control transmission parameters than in the first set of control transmission parameters and the control information is coded in messages of a size being chosen from a set of at least two predetermined control message sizes; and
wherein the selection of the lower value of the transmission code rate is carried out so that the coded information bits fit into a larger message size for control information transmitted using the second set of control transmission parameters, than the message size for control information transmitted using the first set of control transmission parameters for a communication range in the same coverage area.

13. The primary station of claim 11, wherein the data transmission parameter is at least one of: a beamforming mode, a transmission power, a code rate, a modulation scheme, a transmit diversity scheme, a number of spatial layers, a precoding matrix, a number of subcarriers, a frequency band, a spreading factor, and a combination thereof.

14. The primary station of claim 11, wherein the second set of data transmission parameters is generated such that it changes the communication range of the data transmission compared to the first set of data transmission parameters.

15. The primary station of claim 11, wherein the second set of control transmission parameters is generated such that it changes the communication range of the control information compared to the first set of control transmission parameters.

16. The primary station of claim 11, wherein the change in communication range of the control information transmission corresponds approximately to the change in communication range of the data transmission.

17. The primary station of claim 11, wherein the data transmission parameter is a beamforming mode, and wherein the change in communication range is an increase.

18. The primary station of claim 11, wherein the at least one control transmission parameter is a modulation order.

19. The primary station of claim 11, wherein the at least one control transmission parameter is a transmission power.

20. The primary station of claim 11, wherein the at least one control transmission parameter is a frequency band.

21. A method of operating a primary station, comprising:
in a primary station, a processor:
controlling a transmitter to transmit via an antenna array, a first set of control information, using a first set of control transmission parameters, corresponding to a first data transmission using a first set of data transmission parameters; and
controlling the transmitter to transmit via the antenna array, a second set of control information using a second set of control transmission parameters, corresponding to a second data transmission using a second set of data transmission parameters; and
wherein at least one control transmission parameter from among the two sets of control transmission parameters has a difference in value between the two sets of control transmission parameters;
wherein the difference in value of the at least one control transmission parameter is dependent on a difference in value between the value of a data transmission parameter in the first set of data transmission parameters and a value of the corresponding data transmission parameter in the second set of data transmission parameters;
wherein the data transmission parameter is a different parameter from the at least one control transmission parameter
wherein the second set of control transmission parameters is generated such that it provides different communication ranges of the control information transmission; and
wherein the difference in communication range of the control information transmission corresponds approximately to the difference in communication range of the data transmission in the same coverage area.

22. A method of operating a secondary station, comprising:
In a secondary station, a processor:
receiving via an antenna array and a receiver, first control information from a primary station, using a first set of control transmission parameters, corresponding to a first data transmission using a first set of data transmission parameters; and
receiving via the antenna array and receiver, second control information from the primary station with a second set of control transmission parameters, corresponding to a second data transmission using a second set of data transmission parameters; and
wherein at least one control transmission parameter has a difference in value between the first and second sets of control transmission parameters;
wherein the difference in value of the at least one control transmission parameter is dependent on a difference between the value of a data transmission parameter in the first set of data transmission parameters and a value of the corresponding data transmission parameter in the second set of data transmission parameters;
wherein the data parameter transmission is a different parameter from the at least one control transmission parameter, and
wherein the second set of control transmission parameters is generated such that it provides different communication ranges of the control information transmission; and
wherein the difference in communication range of the control information transmission corresponds approximately to the difference in communication range of the data transmission in the same coverage area.

23. A computer-readable storage-medium that is not a transitory propagating signal or wave, the medium modified by control information including instructions for performing a method of operating a primary station, comprising:
in a primary station, a processor:
controlling a transmitter to transmit via an antenna array, a first set of control information, using a first set of control transmission parameters, corresponding to a first data transmission using a first set of data transmission parameters; and
controlling the transmitter to transmit via the antenna array, a second set of control information using a second set of control transmission parameters, corresponding to a second data transmission using a second set of data transmission parameters; and
wherein at least one control transmission parameter from among the two sets of control transmission parameters has a difference in value between the two sets of control transmission parameters;
wherein the difference in value of the at least one control transmission parameter is dependent on a difference in value between the value of a data transmission parameter in the first set of data transmission parameters and a value of the corresponding data transmission parameter in the second set of data transmission parameters;
wherein the data transmission parameter is a different parameter from the at least one control transmission parameter;
wherein the second set of control transmission parameters is generated such that it provides different communication ranges of the control information transmission; and
wherein the difference in communication range of the control information transmission corresponds approximately to the difference in communication range of the data transmission in the same coverage area.

24. A computer-readable storage-medium that is not a transitory propagating signal or wave, the medium modified by control information including instructions for performing a method of operating a secondary station, comprising:
In a secondary station, a processor:
controlling a receiver to receive via an antenna array, first control information from a primary station, using a first set of control transmission parameters, corresponding to a first data transmission using a first set of data transmission parameters; and
controlling the transceiver to receive via the antenna array, second control information from the primary station with a second set of control transmission parameters, corresponding to a second data transmission using a second set of data transmission parameters; and
wherein at least one control transmission parameter has a difference in value between the first and second sets of control transmission parameters;
wherein the difference in value of the at least one control transmission parameter is dependent on a difference between the value of a data transmission parameter in the first set of data transmission parameters and a value of the corresponding data transmission parameter in the second set of data transmission parameters;
wherein the data parameter transmission is a different parameter from the at least one control transmission parameter, and wherein the second set of control transmission parameters is generated such that it provides different communication ranges of the control information transmission; and wherein the difference in communication range of the control information transmission corresponds approximately to the difference in communication range of the data transmission in the same coverage area.

25. The secondary station of claim 2, wherein the data transmission parameter is at least one of: a beamforming mode, a transmission power, a code rate, a modulation scheme, a transmit diversity scheme, a number of spatial layers, a precoding matrix, a number of subcarriers, a frequency band, a spreading factor, and a combination thereof.

26. The secondary station of claim 2, wherein the second set of data transmission parameters is generated such that it changes the communication range of the data transmission compared to the first set of data transmission parameters.

27. The secondary station of claim 26, wherein the data transmission parameter is a beamforming mode, and wherein the change in communication range of the data transmission, is an increase.

28. The secondary station of claim 2, wherein the at least one control transmission parameter is a transmission code rate.

29. The secondary station of claim 28, wherein:
the value of the transmission code rate is lower when using the second set of control transmission parameters than when using the first set of control transmission parameters; and
the control information is coded in messages of a size being chosen from a set of at least two predetermined control information message sizes; and
wherein the selection of the lower value of the transmission code rate is carried out so that the coded information bits fit into a larger message size than the message size for control information transmitted using the first set of control transmission parameters.

30. The secondary station of claim 2, wherein the at least one control transmission parameter is a modulation order.

31. The secondary station of claim 2, wherein the at least one control transmission parameter is a transmission power.

32. The secondary station of claim 2, wherein the at least one control transmission parameter is a frequency band.

33. The secondary station of claim 12, wherein the data transmission parameter is at least one of: a beamforming mode, a transmission power, a code rate, a modulation scheme, a transmit diversity scheme, a number of spatial layers, a precoding matrix, a number of subcarriers, a frequency band, a spreading factor, and a combination thereof.

34. The secondary station of claim 12, wherein the second set of data transmission parameters is generated such that it changes the communication range of the data transmission compared to the first set of data transmission parameters.

35. The secondary station of claim 34, wherein the second set of control transmission parameters is generated such that it changes the communication range of the control information compared to the first set of control transmission parameters.

36. The secondary station of claim 35, wherein the change in communication range of the control information transmission corresponds approximately to the change in communication range of the data transmission.

37. The secondary station of claim 34, wherein the data transmission parameter is a beamforming mode, and wherein the change in communication range of the data transmission, is an increase.

38. The secondary station of claim 12, wherein the at least one control transmission parameter is a modulation order.

39. The secondary station of claim 12, wherein the at least one control transmission parameter is a transmission power.

40. The secondary station of claim 12, wherein the at least one control transmission parameter is a frequency band.

* * * * *